United States Patent [19]

Mietzsch et al.

[11] 4,220,742

[45] Sep. 2, 1980

[54] PROCESS FOR THE POLYMERIZATION OF ETHYLENE IN THE PRESENCE OF DIARYL GLYCOL ETHERS

[75] Inventors: Fritz Mietzsch, Cologne; Hans Rudolph, Krefeld; Heinrich Wolfers, Rheurdt; Heinrich Alberts, Cologne, all of Fed. Rep. of Germany

[73] Assignee: Bayer Aktiengesellschaft, Fed. Rep. of Germany

[21] Appl. No.: 971,391

[22] Filed: Dec. 20, 1978

[30] Foreign Application Priority Data

Dec. 29, 1977 [DE] Fed. Rep. of Germany ....... 2758719

[51] Int. Cl.$^2$ ............................................. C08F 10/02
[52] U.S. Cl. .................................... 526/209; 526/352
[58] Field of Search ......................................... 526/209

[56] References Cited

U.S. PATENT DOCUMENTS

| | | | |
|---|---|---|---|
| 3,278,502 | 10/1966 | Huyser et al. | 526/209 |
| 3,378,533 | 4/1968 | Schnell et al. | 526/209 |
| 3,931,355 | 1/1976 | Rudolph et al. | 526/209 |

*Primary Examiner*—Harry Wong, Jr.
*Attorney, Agent, or Firm*—Connolly and Hutz

[57] ABSTRACT

A process for the polymerization of ethylene and optionally further $\alpha,\beta$-unsaturated monomers at temperatures of from 100° to 350° C. and at pressures of from 600 to 3500 in the presence of 1,2 diaryl glycols atoms or 1,2-diaryl glycol alkyl ethers as initiators.

6 Claims, No Drawings

PROCESS FOR THE POLYMERIZATION OF ETHYLENE IN THE PRESENCE OF DIARYL GLYCOL ETHERS

This invention relates to a process for the polymerisation of ethylene in the presence of 1,2-diaryl glycols or 1,2-diaryl glycol alkyl ethers as initiators.

In principle, ethylene may be polymerised by two different processes, namely the high-pressure process and the low-pressure process. Both processes are worked on an industrial scale (cf. Vieweg, Schley, Schwarz in Kunststoff-Handbuch IV, Polyolefine, Hanser Verlag 1969, pages 39 et seq).

The properties of the polyethylene formed are critically determined by the branching which occurs as a result of chain transfers and which governs melting point, crystallinity and density. For example, the melting point and density of a slightly branched polyethylene amounts to about 130° C. and about 0.95 g/cc, respectively, whilst a highly branched polyethylene has a melting point of from 110° to 115° C. and a density of from 0.92 to 0.935 g/cc.

Highly crystalline, unbranched polyethylene having a density of from 0.95 to 0.96 g/cc is obtained by the low pressure process at temperatures below 100° C., preferably from 50° to 80° C., and under low pressure, for example 10 atmospheres or even atmospheric pressure, in the presence of organometallic compounds which are known as Ziegler catalysts. A "Ziegler catalyst" is a combination of a compound of a transition metal of Secondary Groups IVa to VIa of the Periodic Table and an organometallic compound of a metal of Groups I to III of the Periodic Table of elements by Lothar Mayer and Mendelejeff. A commonly used Ziegler catalyst system is based on a titanium compound, for example, titanium tetrachloride, and an aluminium compound, for example triethyl aluminium or diethyl aluminium chloride. Since such catalysts are decomposed by impurities, such as alcohols, amines, water, etc., this process requires extremely clean apparatus and extremely pure ethylene as starting material.

British Pat. No. 828,828 describes a process for the polymerisation of olefins, particularly ethylene, at a temperature of at least 175° C. and under a pressure of at least 500 atms. The thus-produced polyethylene has densities of up to 0.95 g/cc. However, this process, like the low pressure process, requires Ziegler catalysts.

In addition to the low pressure polymerisation of ethylene, the so-called "high pressure" process has proved to be particularly effective in practice. This process is carried out at a high temperature and under a high pressure, for example at temperatures above 125° C. and under pressures above 500 atms and, more particularly, at temperatures of from 140° to 300° C. and under pressures of from 1000 to 3000 atms and higher.

The high pressure polymerisation process is distinguished from the low pressure process by a very high volume-time yield and imposes less requirements on the purity of the starting compounds. However, since it produces highly branched polyethylene, attempts have been made to develop a polymerisation process which gives a slightly branched polyethylene under the high pressure polymerisation conditions.

According to investigations conducted by C. A. Mortimer and W. F. Hammer, as reported in J. Polym. Sci. A 2/3, 1301 (1964), the degree of branching and density of high pressure polyethylene are largely unaffected by the type of radical-former used and, as mentioned above, are, for the most part, only influenced by the ethylene pressure and the reaction temperature in such a way that the degree of branching increases considerably with increasing pressure. As a result, clearly branched polyethylenes are generally obtained under pressures above only 600 atms.

It has now surprisingly been found that slightly branched polyethylene having a density of more than 0.935 g/cc, preferably from 0.938 to 0.950 g/cc, and a melting point of at least 115° C., preferably from 117° to 125° C., may be obtained by polymerising ethylene at temperatures of at least 100° C., preferably from 130° to 300° C., and under a pressure of at least 600 atms, preferably from 700 to 3000 atms, in the presence of radical-forming initiators, providing compounds based on the pinacol structure are used as initiators.

Accordingly, the present invention relates to a process for the homo- or co-polymerisation of ethylene optionally in the presence of a solvent at temperatures of from 100° to 350° C., preferably from 130° to 300° C., and under a pressure of from 600 to 3500 atms, preferably from 700 to 3000 atms, in the presence of initiators, wherein the initiators used are 1,2-glycols or 1,2-glycol derivatives corresponding to the following general formula (I):

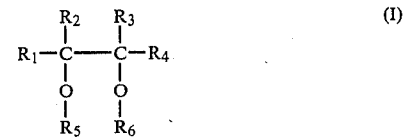

wherein $R_1$ and $R_3$, which may be the same or different, each represents an aryl radical (preferably containing 6 to 12 carbon atoms, more preferably phenyl, tolyl, p-tert.-butyl phenyl, o- and p-chlorophenyl, 2,4-dichlorophenyl, naphthyl, biphenylyl or m-methoxy phenyl) optionally substituted by $C_1-C_4$ alkyl (preferably methyl), methoxy, chlorine or fluorine; and $R_2$, $R_4$, $R_5$ and $R_6$ which may be the same or different, either have the same meanings as $R_1$ and $R_3$ or each represents a $C_1-C_6$ alkyl radical optionally substituted by $C_1-C_4$ alkyl (preferably methyl), methoxy, chlorine or fluorine (preferably methyl, ethyl or isopropyl); a $C_5-C_7$ cycloalkyl radical, preferably cyclohexyl, or hydrogen.

Although the German Auslegeschrift No. 1,216,877 describes a process for polymerising ethylene in the presence of tetra-substituted, 1,2-glycols at temperatures of from 100° to 250° C. and under pressures of up to 540 atms, this process gives only low molecular weight polyethylenes in only moderate volume-time yields.

For carrying out the polymerisation reaction, the initiator is used in a quantity of from 0.001 to 10%, by weight, preferably from 0.01 to 2.0%, by weight, based on the quantity of ethylene used or on the sum of ethylene and other monomers. The initiators may be added as such, although they are preferably added in solution. Suitable solvents include: lower alcohols, such as methanol, ethanol, isopropanol and tert.-butanol, carboxylic acid esters with $C_2-C_{20}$ such as acetic acid esters, ethers, such as diethyl ether, dibutyl ether, anisole, tetrahydrofuran, dioxane and 1,2-dimethoxy ethane, hydrocarbon and alkyl substituted aromatic hydrocarbon solvents, such as benzene, toluene or xylene, straight-chain or branched-chain paraffins, such as petroleum ether and light petrol, cycloaliphatic hydrocarbon solvents, such as cyclohexane and decalin, trialkyl phosphates, such as triethyl phosphate, N-N-disubstituted amides, such as N,N-dimethyl acetamide and hexamethyl phosphoric acid triamide, or mixtures of the mentioned solvents.

Particularly preferred initiators are pinacols, such as acetophenone pinacol, benz-pinacol, 1,2-diphenyl-1,2-di-(4-tolyl)-1,2-glycol, tetra-(4-tolyl)-1,2-glycol, 1,2-diphenyl-1,2-di-(4-tert.-butylphenyl)-1,2-glycol and tetra-(4-chlorophenyl)-1,2-glycol, and pinacol ethers, such as benz-pinacol monomethyl ether, benz-pinacol dimethyl ether, acetophenone pinacol dimethyl ether and tetra-(4-tolyl)-1,2-glycol dimethyl ether.

The process according to the present invention may be carried out in batches, although it is preferably carried out continuously in stirrer-equipped vessels or tube reactors. On completion of the polymerisation reaction, the polymer formed in the reactor or in the reactors is separated from the unreacted ethylene and worked-up in the conventional way. The unreacted ethylene is mixed with fresh ethylene and returned to the reactor.

The process according to the present invention may be carried out in the presence or absence of solvents. Suitable solvents for the polymerisation of ethylene include: lower alcohols, such as methanol, ethanol and tert.-butanol, carboxylic acid esters with $C_2$-$C_{20}$, such as ethyl acetate, aromatic hydrocarbons, such as benzene, toluene and xylene straight-chain or branched-chain paraffins, such as petroleum ether, light petrol or other petrol fractions, cycloaliphatic hydrocarbon solvents, such as cyclohexane or mixtures of the mentioned solvents. Where the process is carried out in the presence of solvents, it is preferred to use hydrocarbon solvents.

In order to reduce molecular weight and, hence, to increase the melt index the present process may also be carried out in the presence of chain transfer agents, such as mercaptans. Since the molecular weight may also be controlled by the reaction conditions, preferably temperature and pressure, it is possible to vary the properties of the polyethylene over a wide range. However, the precise effect which particular conditions cause may only be determined by experiment.

The present process may also be used for the production of copolymers of ethylene with other $\alpha,\beta$ unsaturated monomers, such as (meth)acrylic acid, (meth)acrylic acid esters or vinyl acetate. Various additives may be introduced as required into the ethylene polymers and copolymers produced in accordance with the present invention, such as anti-oxidants, UV-stabilisers, sulphur compounds, phosphorus compounds, dyes, pigments, fillers, antistatic agents or flameproofing agents in known amounts.

The ethylene homo- and co-polymers produced according to the present invention may be processed in the conventional way into films, preferably for the packaging sector, coatings, injection mouldings and extruded sheets, for example for deep drawing or stamped mouldings.

EXAMPLE 1

A 1000 ml stirrer-equipped autoclave comprising a 20 ml metering attachment and a shut-off valve was filled with 200 ml of cyclohexane. 200 mg. of tetra-(4-tolyl)-1,2-glycol in the form of a solution in 10 ml of cyclohexane were introduced into the metering attachment. All the air present in the reactor was then carefully removed by repeated evacuation and purging using ethylene. Ethylene was introduced at 25° 1 C. up to a pressure of 400 bars. The temperature was then increased to 150° C. and the internal pressure to 1000 bars by the introduction under pressure of more ethylene. After the equilibrium state had been reached, the contents of the metering attachment were introduced under pressure with ethylene into the autoclave. The reaction began immediately, as reflected in a rapid drop in the internal pressure of the reactor. However, an excessive drop in pressure was prevented by the introduction of more ethylene. After a reaction time of 60 minutes, the reactor was cooled, vented and opened in order to remove the ethylene polymer formed. The polymer obtained was dried in vacuo at 50° C. to constant weight. 152 g of polymer having an intrinsic viscosity $[\eta]$ of 0.41 dl/g, as measured in tetralin at 120° C.(*), were obtained. The polymer had a density of 0.943 g/ml and a melting point of 120° C.(**).

EXAMPLE 2

The procedure was as in Example 1, except that tetra-(4-tolyl)-1,2-glycol dimethyl ether was used as the initiator and the polymerisation reaction was carried out at 140° C. 170 g of polyethylene having an intrinsic viscosity of 0.56 dl/g(*) and a density of 0.94 g/ml were obtained. Melting point of the polymer: 118° C.(**)

EXAMPLE 3

A 150 ml high pressure reactor for the continuous polymerisation of ethylene, equipped with an effective stirrer, was charged with 580 g/h of ethylene. Immediately in front of the reactor inlet, 340 mg/h of the initiator of Example 1, in the form of a 20% solution in cyclohexane, was introduced into the stream of ethylene. By external heat supply and by adjusting the pressure-retaining valve at the reactor outlet, an internal temperature of 195° C. and an internal pressure of 1800 bars were adjusted. 85 g/h of polymer were removed from the venting receiver. The polymer had an intrinsic viscosity of 0.71 dl/g(*) a density of 0.941 g/ml and a melting point of 119° C.(**)

(*) W. Hoffmann, H. Kromer and R. Kuhn in "Polymeranalytik I", Georg Thieme Verlag, Stuttgart 1977
(**) W. Hoffmann, H. Kromer and R. Kuhn in "Polymeranalytik II", George Thieme Verlag, Stuttgart 1977, pages 172 et seq.

We claim:

1. A process for the preparation of an ethylene polymer wherein ethylene and optionally one or more $\alpha,\beta$ unsaturated comonomers are polymerised at a temperature of from 100° to 350° C. and under a pressure of from 600 to 3500 atmospheres in the presence of an initiator corresponding to the following general formula:

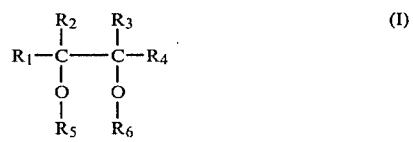

wherein
$R_1$ and $R_3$, which may be the same or different, each represents an aryl radical which may be substituted one or more times by $C_1$-$C_4$ alkyl, methoxy, chlorine or fluorine; and $R_2$, $R_4$, $R_5$ and $R_6$, which may be the same or different either have the same meaning as $R_1$ and $R_3$ or each represents a $C_1$-$C_6$ alkyl radical or an aryl radical either of which may be substituted one or more times by $C_1$-$C_4$ alkyl, methoxy, chlorine or fluorine, a $C_5$-$C_7$ cycloalkyl radical or hydrogen.

2. A process as claimed in claim 1 wherein the temperature is from 130° to 300° C.

3. A process as claimed in claim 1 in which the pressure is from 700 to 3000 atmospheres.

4. A process as claimed in claim 1 wherein from 0.001 to 10%, by weight, based on monomer(s), of initiator is used.

5. A process as claimed in claim 3 in which from 0.01 to 2.0%, by weight, based on monomer(s), of initiator is used.

6. A process as claimed in claim 1 wherein the initiator is selected from the group consisting of acetophenone pinacol, benz-pinacol, 1,2-diphenyl-1,2-di-(4-tolyl)-1,2-glycol, tetra-(4-tolyl)-1,2-glycol, 1,2-diphenyl-1,2-di-(4-tert.butylphenyl)-1,2-glycol, tetra-(4-chlorophenyl)-1,2-glycol, benz-pinacol monoethyl ether, benz-pinacol dimethyl ether, acetophenone pinacol dimethyl ether and tetra-(4-tolyl)-1,2-glycol dimethyl ether.

* * * * *